(12) United States Patent
Johnson et al.

(10) Patent No.: US 9,637,806 B2
(45) Date of Patent: May 2, 2017

(54) SILVER RECOVERY METHODS AND SILVER PRODUCTS PRODUCED THEREBY

(71) Applicant: CORNING INCORPORATED, Corning, NY (US)

(72) Inventors: Benedict Yorke Johnson, Horseheads, NY (US); Samuel Odei Owusu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 134 days.

(21) Appl. No.: 14/424,254

(22) PCT Filed: Aug. 29, 2013

(86) PCT No.: PCT/US2013/057304
§ 371 (c)(1),
(2) Date: Feb. 26, 2015

(87) PCT Pub. No.: WO2014/036270
PCT Pub. Date: Mar. 6, 2014

(65) Prior Publication Data
US 2015/0211091 A1  Jul. 30, 2015

Related U.S. Application Data

(60) Provisional application No. 61/695,777, filed on Aug. 31, 2012.

(51) Int. Cl.
*C22B 11/00* (2006.01)
*C22B 3/16* (2006.01)
(Continued)

(52) U.S. Cl.
CPC ............ *C22B 11/04* (2013.01); *B22F 1/0018* (2013.01); *B22F 9/24* (2013.01); *B82Y 30/00* (2013.01);
(Continued)

(58) Field of Classification Search
CPC ........ B22F 1/0018; B22F 9/24; C02F 1/5272; C02F 1/66; C22B 11/04; C22B 1/66
See application file for complete search history.

(56) References Cited

U.S. PATENT DOCUMENTS 2,005,018 A    6/1935   West et al.
3,334,995 A    8/1967   Gaspar
(Continued)

FOREIGN PATENT DOCUMENTS

CN    1106326 A    8/1995
CN    1718330 A    1/2006
(Continued)

OTHER PUBLICATIONS

Bouis, Paul A. "Reagents, Buffers, and Indicators." Reagents, Buffers, and Indicators (2006): 95-106. ACS Publication. American Chemical Society . . . .*

(Continued)

*Primary Examiner* — George Wyszomierski
*Assistant Examiner* — Tima M McGurthy Banks
(74) *Attorney, Agent, or Firm* — Jie Gao

(57) ABSTRACT

Described herein are methods of recovering silver from solution to produce metallic (i.e., elemental) silver. These methods generally include a step of providing a silver-containing aqueous solution that includes cationic silver species, followed by a step of forming a reaction solution that includes an organic acid, a buffering agent, and the cationic silver species, and a step of generating a reaction product that includes metallic silver by reducing the concentration of the cationic silver species in the reaction solution. Also described herein are metallic or elemental silver produced by these methods.

17 Claims, 3 Drawing Sheets

(51) Int. Cl.
B22F 1/00 (2006.01)
B22F 9/24 (2006.01)
B82Y 30/00 (2011.01)
C02F 1/52 (2006.01)
C02F 1/66 (2006.01)
C22B 3/00 (2006.01)
C02F 101/20 (2006.01)

(52) U.S. Cl.
CPC .............. *C02F 1/5272* (2013.01); *C02F 1/66* (2013.01); *C22B 3/1666* (2013.01); *C02F 2101/20* (2013.01)

(56) References Cited

U.S. PATENT DOCUMENTS

| | | | |
|---|---|---|---|
| 3,649,250 | A | 3/1972 | Dorenfeld et al. |
| 4,039,327 | A | 8/1977 | Dietz, Jr. et al. |
| 4,078,918 | A | 3/1978 | Perman |
| 4,131,455 | A | 12/1978 | Edwards et al. |
| 4,293,332 | A | 10/1981 | Wang et al. |
| 4,445,935 | A | 5/1984 | Posey et al. |
| 4,496,470 | A * | 1/1985 | Kapiloff .................. B01D 61/10 134/42 |
| 4,539,041 | A | 9/1985 | Figlarz et al. |
| 5,089,097 | A | 2/1992 | Goto et al. |
| 5,885,535 | A | 3/1999 | Asano et al. |
| 6,231,637 | B1 | 5/2001 | Tayama et al. |
| 6,277,290 | B1 | 8/2001 | Ren et al. |
| 8,715,387 | B2 * | 5/2014 | Irizarry .................. B22F 1/0011 75/371 |
| 2004/0159185 | A1 | 8/2004 | Shamblen et al. |
| 2005/0183543 | A1 | 8/2005 | Sasaki et al. |
| 2006/0090599 | A1 | 5/2006 | Goia et al. |
| 2006/0159603 | A1 | 7/2006 | Vanheusden et al. |
| 2007/0056402 | A1 | 3/2007 | Cho et al. |
| 2009/0236567 | A1 | 9/2009 | Ogi et al. |
| 2009/0242231 | A1 | 10/2009 | Miyagisima et al. |
| 2010/0065789 | A1 | 3/2010 | Sato |
| 2010/0276647 | A1 * | 11/2010 | Irizarry .................. B22F 1/0025 252/514 |
| 2012/0225126 | A1 | 9/2012 | Geckeler et al. |

FOREIGN PATENT DOCUMENTS

| | | |
|---|---|---|
| CN | 101065205 | 10/2007 |
| CN | 101774026 | 4/2011 |
| CN | 102205421 A | 10/2011 |
| CN | 102407342 | 4/2012 |
| DE | 4209180 | 9/1993 |
| JP | 2003293049 | 10/2003 |
| JP | 2006348375 | 12/2006 |
| JP | 2004190135 | 7/2007 |
| JP | 2009144197 A | 7/2009 |
| RO | 116096 | 10/2000 |
| RU | 2170277 | 7/2001 |
| RU | 2258091 | 8/2005 |

OTHER PUBLICATIONS

CN201380051315.2 Search Report Dated Dec. 24, 2015; 2 Pages.
DE112013004232.0 Office Action Dated Nov. 11, 2015.
Debnath et al; Solid-State Synthesis of Silver Nanoparticles at Room Temperature: Poly (Vinylpyroolidone) as a Tool; Macromolecular Rapid Communications (2010), vol. 31, Issue 6, pp. 549-553.
Gonzalez et al; "Silver Recovery From Acidic Solutions by Formation of Nanoparticles and Submicroparticles of Ag on Microfiltration Membranes"; www.intechopen.com; Mass Transfer—Advanced Aspects; 23 Pages.
Sinha et al; "Preparation of Silver Powder Through Glycerol Process"; Bull. Mater. Sci. vol. 28, No. 3, Jun. 2005, pp. 213-217.
Tatykhanova et al; "Preparation of Gold and Silver Nanoparticles by Mechanical Activation"; Nanomaterials: Applications and Properties (NAP-2011) vol. 1, Part 1, pp. 165-168
Yang et al; "Study of the Solid Reaction of Gold Compounds"; Chemical World, (3), Mar. 25, 1997; pp. 126-127.
Zhouxiang et al; "A Method to Recover Silver From Wast X-Ray Films With Spent Fixing Bath"; Hydrometallurgy, 92 (2008) 148-151.
Chen et al; "Key Factors in Chemical Reduction by Hydrazine for Recovery of Precious Metals"; Chemosphere, 49, 2002, 363-370.
Patent Cooperation Treaty International Notification of Transmittal of the International Search Report and The Written Opinion of the International Searching Authority, international application No. PCT/US2013/057304: mailing date Nov. 22, 2013, 13 pages.
Patent Cooperation Treaty International Notification of Transmittal of the International Preliminary Report of Patentability Report on Patentability (Chapter I of the Patent Cooperation Treaty) of the International Searching Authority, international application No. PCT/US2013/057304: mailing date Mar. 12, 2015, 12 pages.
Blanchard, Final Report: Recovery of Silver From CEPOD Anolyte Solutions, Sep. 1994, 31 pages.
Gonzelas, "Silver Recovery from Acidic Solutions by Formation of Nanoparticles and Submicroparticles of Ag on MIcrofiltration Membranes," Mass Transfer—Advanced Aspects, Jul. 2011. 439-461.
Chang Gun Lee, "Synthesis of High-Purity Silver Colloids using a Thermal Decomposition Method," Metals and Materials International, vol. 14, No. 2, Apr. 26, 2008, pp. 189-192.
Qin y et al, "Size Control over Spherical Silver Nanoparticles by Ascorbic Acid Reduction." Colloids and Surfaces. A, Physicachemical and Engineering Aspects, Elsevier, Amsterdam, NL, vol. 372, No. 1-3, Dec. 3, 2010, pp. 172-176.
Songping W, et al., "Preparation of ultrafine silver powder using ascorbic acid as reducing agent and its application in MLCI", Materials Chemistry and Physics, Elsevier, SA, Switzerland, Tiawan, Republic of China, vol. 89, No. 23, Feb. 15, 2005, pp. 423-427, XP027858575.
Guiquang Guo et al., "Preparation and dispersive mechanism of highly dispersive ultrafine silver powder", Applied Surface Science, vol. 256, No. 22, Sep. 1, 2010, pp. 6683-6687, XP055087130.
Patent Cooperation Treaty International Notification of Transmittal of the International Search Report and The Written Opinion of the International Searching Authority, international application No. PCT/US2013/057293: mailing date Nov. 22, 2013, 13 pages.
Dennis Steinigeweg and Sebastian Schlucker, "Monodispersity and Size Control in the Synthesis of 20-100 nm Quasi-Spherical Silver Nanoparticles by Citrate and ascorbic Acid Reduction in Glycerol Water Mixtures." Chem. Commun., 2012, 48, pp. 8682-8684.
Patent Cooperation Treaty International Notification of Transmittal of the International Search Report and The Written Opinion of the International Searching Authority, international application No. PCT/US2013/057237: mailing date Nov. 22, 2013, 13 pages.
Anna Zielinska, "Preparation of silver nanoparticles with controlled particle size", vol. 1, No. 2, Nov. 1, 2009, pp. 1560-1566, XP055086848.
Chinese Patent Application No. 201380041478.2, Notce of First Office Action English Translation, Mar. 3, 2016, 11 pages.
Sondi et al., Preparation of highly concentrated stable dispersions of uniform silver nanoparticles, Journal of Colloid and Interface Science, 260 (2003) 75-81.
Alqadi at al., pH effect on the aggregation of silver nanoparticles synthesized by chemical reduction, Materials Science—Poland, 32(1), 2014. 107-111.
Ethylene Glycol: Systemic Agent, Centers for Disease Control and Prevention, updated Nov. 20, 2014.
Lanying et al; "Research on New Process of Recovering High Purity Silver From Low Silver-Contaning Waste"; Hunan Non-Ferrous Metal; vol. 10, No. 1; p. 38-41 Feb. 1994.
Perman; "Recovery of Silver From Silver Chloride Residues"; Talanta, vol. 26, pp. 603-607, 1978 (TMM).

* cited by examiner

SILVER RECOVERY METHODS AND SILVER PRODUCTS PRODUCED THEREBY

CROSS REFERENCE TO RELATED APPLICATIONS

This application claims the benefit of priority under 35 U.S.C. 365 of International Patent Application Serial No. PCT/US13/57304, filed on Aug. 29, 2013, designating the United States of America, which in turn, claims the benefit of priority under 35 U.S.C. §119 of U.S. Provisional Application Ser. No. 61/695,777 filed on 31 Aug. 2012 the content of which are relied upon and incorporated herein by reference in their entirety as if fully set forth below.

TECHNICAL FIELD

The present disclosure relates generally to methods of removing silver species from solution. More particularly, the various embodiments described herein relate to methods of precipitating silver species from solution to produce metallic (i.e., elemental) silver, as well as to the metallic silver produced therefrom.

BACKGROUND

Silver is used extensively for industrial purposes owing to its exceptional properties (e.g., high electrical and thermal conductivity, malleability, ductility, and its resistance to corrosion). To illustrate, common uses for, or products incorporating, silver or silver compounds include photographic materials, electroplating, electrical conductors, dental alloys, solder and brazing alloys, paints, jewelry, coins, mirror production, antibacterial agents, and water purification.

With such extensive use, not only is there a tremendous consumption of metallic silver, there is also a large production of silver-containing wastewater. The discharge of silver, and other metals, is a concern of both government regulatory agencies and the industries that use silver in their manufacturing processes. In fact, silver is a regulated material. Consequently, there are limits to the amount of silver that can be present in streams that are discharged into normal industrial sewage systems or the like. In addition, supplies of silver raw materials are dwindling because of their scarcity, while demands for silver in industries are still increasing. Therefore, recovery of silver from industrial wastewaters is of interest, for both water resource protection and silver reclamation.

To date, many methods have been developed to recover silver from industrial wastewaters, including chemical reduction, membrane filtration, ion exchange adsorption and electrochemical methods. Each of the methods has distinct advantages and disadvantages in practical applications. For example, existing methods based on chemical reduction offer simplicity, low manufacturing cost, fast reaction times, and efficient scale-up efficiency/ease for large scale wastewater treatment. On the other hand, the reducing agents employed for such methods are frequently toxic and/or carcinogenic, and can cause safety and health problems when implemented in high volumes.

There accordingly remains a need for improved technologies that can be used to recover silver from industrial wastewaters. It would be particularly advantageous if these methods provided minimal health and safety impact while simultaneously maintaining, or improving upon, the positive attributes of existing silver recovery techniques. It is to the provision of such technologies that the present disclosure is directed.

BRIEF SUMMARY

Described herein are various methods of recovering metallic silver from process waste streams, as well as silver particles recovered therefrom.

One type of method for treating a silver-containing solution involves providing a silver-containing aqueous solution comprising cationic silver species; disposing an organic acid and a buffering agent in the silver-containing aqueous solution to form a reaction solution comprising a concentration of the organic acid, a concentration of the buffering agent, and a concentration of the cationic silver species, wherein the concentration of the organic acid is equimolar to or in a stoichiometric excess of the concentration of the cationic silver species; and generating a reaction product comprising metallic silver, thereby reducing the concentration of the cationic silver species in the reaction solution.

One type of metallic silver product can be produced in accordance with one or more of the embodiments of the type of method described directly above.

Another type of method for treating a silver-containing solution involves providing a silver-containing aqueous solution comprising cationic silver species; disposing ascorbic acid and a buffering agent comprising sodium phosphate dibasic and citric acid in the silver-containing aqueous solution to form a reaction solution comprising a concentration of the ascorbic acid, a concentration of the buffering agent, and a concentration of the cationic silver species, wherein the concentration of the ascorbic acid is equimolar to or in a stoichiometric excess of the concentration of the cationic silver species; generating a reaction product comprising metallic silver, thereby reducing the concentration of the cationic silver species in the reaction solution to less than or equal to about 5 parts per million; and separating the metallic silver from a remaining portion of the reaction product and the reaction solution.

Another type of metallic silver product can be produced in accordance with one or more of the embodiments of the type of method described directly above such that the metallic silver product includes less than 20 parts per million of non-silver metals and an average particle size of less than or equal to about 1 micrometer.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

Figure 1:
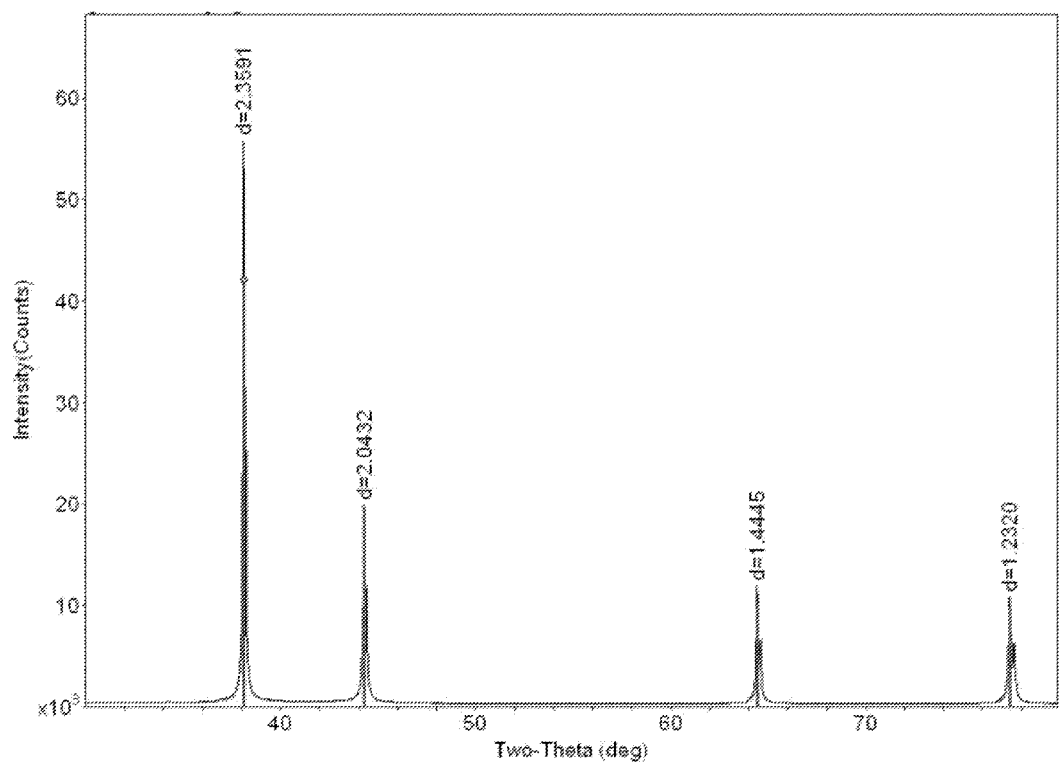
FIG. 1 is a powder X-ray diffraction pattern of the silver product recovered in accordance with EXAMPLE 1.

These and other aspects, advantages, and salient features will become apparent from the following detailed description, the accompanying drawings, and the appended claims.

DETAILED DESCRIPTION

Referring now to the figures, wherein like reference numerals represent like parts throughout the several views, exemplary embodiments will be described in detail. Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item.

The methods described herein are based generally on the use of an organic acid under stable pH conditions to both reduce the concentration of cationic silver species in a solution and produce metallic (i.e., elemental) silver. These methods advantageously provide fast silver reduction and precipitation from the solution without the need to continuously adjust pH levels for optimal chemical reduction.

These methods generally include a step of providing a silver-containing aqueous solution that includes cationic silver species, followed by a step of forming a reaction solution that includes an organic acid, a buffering agent, and the cationic silver species, and a step of generating a reaction product that includes metallic silver by reducing the concentration of the cationic silver species in the reaction solution. In these methods, the organic acid serves as a reducing agent by which the cationic silver species is reduced to its metallic or elemental state, and the buffering agent serves to maintain a stable pH range throughout the process.

In general, the silver-containing aqueous solution is provided through a separate process that generates silver-containing aqueous waste. For example, this can include silver electroplating processes in the electronics industry where metal surfaces are plated with silver. The silver-containing aqueous waste solutions are generated during surface cleaning, rinsing, silver stripping, and from the spent plating electrolyte. In another example, silver-containing aqueous waste solutions are produced in the photography or imaging industries during processing of photographic materials, industrial x-rays, or medical x-rays. In yet another example, silver-containing aqueous waste solutions are generated when cleaning, rinsing, or otherwise processing glass or other material surfaces that underwent a silver ion exchange process to impart the surfaces with antimicrobial properties.

Regardless of the process by which the solution is made, any aqueous solution having cationic silver species dissolved therein can be processed according to the methods described herein. That is, the silver-containing aqueous solution is not limited to a particular composition, as the methods described herein will yield metallic silver from any of a variety of solution compositions. For example, the silver-containing aqueous solution can comprise a binary silver salt (e.g., silver nitrate, silver nitrite, silver sulfate, silver phosphate, a silver halide, or the like), a ternary or multinary salt that includes a cationic silver species and a different cationic species, a mixture thereof, or a combination comprising one or more of the foregoing silver-containing salts and a non-silver-containing salt.

In general, formation of the forming a reaction solution involves disposing an organic acid and a buffering agent in the silver-containing aqueous solution. This can be achieved, for example, by combining or mixing particles or a solution of the organic acid with particles or a solution of the buffering agent and disposing the combination directly into the silver-containing aqueous solution, by disposing particles or a solution of the organic acid and the buffering agent sequentially (in any order) into the silver-containing aqueous solution, by combining a first amount of silver-containing aqueous solution having particles or a solution of the organic acid disposed therein with a second amount of the silver-containing aqueous solution having particles or a solution of the buffering agent disposed therein, or the like. Those skilled in the art to which this disclosure pertains will recognize that other techniques for forming the reaction solution can be implemented without departing from the methods described herein. The reaction solution, when formed, will have an initial concentration of the organic acid, an initial concentration of the buffering agent, and an initial concentration of the cationic silver species.

The choice of organic acid is not limited to a particular composition, as the methods described herein will yield metallic silver using any of a variety of material choices. The only requirement for the organic acid is that it is soluble in the silver-containing aqueous solution. For example, the organic acid can be lactic acid, citric acid, oxalic acid, ascorbic acid, fumaric acid, maleic acid, or the like, or a mixture thereof.

Similarly, the choice of buffering agents is not limited to a particular composition, as the methods described herein will yield metallic silver using any of a variety of material choices. The only requirements for the buffering agent are that it is soluble in the silver-containing aqueous solution and that it be able to maintain a stable pH during the chemical reduction reaction between the specific organic acid chosen and the cationic silver species of the silver-containing aqueous solution. A "stable pH" for the purposes of this disclosure is one that does not move more than about 0.3 pH units in either direction on the pH scale during the reaction. In certain implementations, the pH does not move more than about 0.1 units in either direction on the pH scale during the reaction. For example, the buffering agent can be sodium phosphate dibasic, sodium phosphate monobasic, citric acid, or the like.

In preparing the reaction solution, there is no particular limitation on the ratio or relative amounts of the components thereof. To ensure that all or substantially all of the cationic silver species in the reaction solution are reduced to metallic silver, however, the molar ratio of the organic acid to the cationic silver species in the reaction solution should be greater than or equal to about 1. That is, the concentration of the organic acid should be at least equimolar to, or in a stoichiometric excess of, the concentration of cationic silver species in the reaction solution. With respect to the buffering agent, the concentration of the buffering agent in the reaction solution should be sufficient to maintain a stable pH. Determination of an appropriate amount of the buffering agent is well within the capabilities of those skilled in the art to which this disclosure pertains.

In certain implementations of the methods described herein, an optional base or basic material can be used to adjust the initial pH of the reaction solution to a desired range. The optional base can be used to ensure that the buffering agent maintains the appropriate stable pH level throughout the reaction process.

When the optional base is used, it can be disposed directly in the reaction solution after the organic acid and buffering agent are disposed in the in the silver-containing aqueous solution. This can be accomplished by using a particulate-based base that is added directly to the reaction solution, by disposing a solution comprising the optional base directly to the reaction solution, and/or the like.

Any suitable base may be used to adjust the pH of the reaction solution. Suitable bases include inorganic bases such as alkali or alkaline earth hydroxides, carbonates, bicarbonates, phosphates, or the like. Other bases include organic bases such as citrate, pyridine morpholine, or the like. By way of illustration, examples of such bases include sodium citrate, sodium bicarbonate, ammonium hydroxide, sodium hydroxide, potassium hydroxide, calcium phosphate, magnesium sulfate, or the like.

The amount of the optional base used will depend on the targeted initial pH for the reaction solution. Those skilled in the art to which this disclosure pertains can readily determine the appropriate amount of the optional base to use if desired.

Once the reaction solution is formed, the reaction product comprising metallic silver can be generated. During the reaction product-generating step, the concentration of the cationic silver species in the reaction solution is reduced in an amount commensurate with the amount of metallic silver produced. Generation of some reaction product occurs almost immediately after the addition of at least the organic acid to the silver-containing aqueous solution. In most implementations, however, there may be a delay before some demonstrable or visible amount of reaction product is generated. This step is identified by the precipitation of metallic silver from solution. While the reaction product-generating step can take place under different atmospheric conditions (e.g. in argon, nitrogen, or the like), in most implementations, it is generally conducted in air.

In certain implementations, the reaction product-generating step can comprise heating and/or mixing the reaction solution to facilitate or expedite the formation of the reaction product. When both are implemented, the optional heating and mixing steps can be implemented simultaneously or sequentially (in either order).

When the heating step is employed, the reaction solution is heated to an elevated temperature for a time that is sufficient to increase the generation of the reaction product. The reduction reaction, as facilitated by the heating step, is an exothermic reaction. Thus, to avoid reducing the efficiency of the reduction reaction, the temperature to which the reaction solution is heated should be less than or equal to about the boiling point of the reaction solution. In general, when heating is employed, the temperature of the reaction solution will be elevated to less than or equal to about 90° C.

When the mixing step is employed, this generally involves mixing the reaction solution for a time that is sufficient to increase the generation of the reaction product. The physical mixing of the reaction dispersion can be effected by a number of techniques. This includes the use of stirring, mechanical shearing, shaking, sonicating, or the like. During the mixing step, actual mixing can be performed in a continuous manner or in a periodic, discontinuous manner. The degree or intensity of mixing can be range from slight agitation to violent movement or upheaval.

The duration of the product-generating step will generally depend on whether the reduction reaction is allowed to proceed naturally or whether the optional heating and/or mixing steps are implemented. The upper limit of this duration will be that which is necessary to chemically reduce the desired amount of cationic silver species to metallic silver. In general, the duration of the product-generating step will be about 5 minutes to about 24 hours. In most implementations, however, the duration of the heating step will be about 10 minutes to about 3 hours.

Those skilled in the art to which this disclosure pertains will recognize that the use of the optional heating and/or mixing steps can result in shorter product-generating step durations. The exact time of a given product-generating step can readily be determined by those skilled in the art to which this disclosure pertains without undue experimentation.

After a specified duration for the product-generating step, the reaction solution can be characterized to determine whether it contains a sufficiently low enough concentration of cationic silver species that it can be discharged (e.g., into a sewage line or other such waste collection reservoir). If not, the product-generating step can be allowed to continue until such time that the cationic silver species concentration is low enough.

In addition, once the product-generating step has progressed to the extent desired, the metallic silver can be recovered or isolated from the reaction product. The recovery or isolation step can involve physical separation (e.g., by filtering, decanting, or the like) of the metallic silver from the remainder of the reaction product and/or reaction solution. If the reaction product includes additional solids or precipitates, the recovery or isolation step can involve the use of a solvent in which metallic silver particles are dispersed and the remaining portion of the reaction product (i.e., other solid reaction byproducts) is dissolved, followed by separating (e.g., by filtering, decanting, or the like) the metallic silver from the solvent with the remaining portion of the reaction product dissolved therein. Suitable solvents for this step will be those in which metallic silver is not soluble and with which metallic silver does not react. These solvents include water, simple alcohols (e.g., methanol, ethanol, propanol, and the like), or the like.

While the optional recovery step can be performed just after the product-generating step, in situations where the optional heating step is implemented, the recovery step will be performed after the reaction product and/or reaction solution is cooled to a lower temperature (e.g., to room temperature).

The above described methods, in their various implementations, can be highly efficient. That is, the concentration of the cationic silver species in the reaction solution after the product-generating step can be reduced to less than 5 parts per million (ppm), as quantified, for example, by techniques such as inductively coupled plasma-optical emission spectroscopy (ICP-OES). In certain implementations, this concentration can be less than 1 ppm. In addition, fractional yields for silver in the reaction product of greater than 90 percent (%) are readily achievable. In many implementations, particularly those in which a stoichiometric excess of the organic acid is used, a fractional yield of 100% can be obtained.

Additionally, the metallic silver product that is produced using the above described methods can be highly pure. That is, the recovered or isolated metallic silver will generally have less than 20 ppm of non-silver metals as quantified, for example, by techniques such as inductively coupled plasma-mass spectrometry (ICP-MS). In many implementations, particularly those in which the product-generating step times are longer and/or includes the heating and/or mixing steps, and in which the recovery step is more thoroughly performed, the recovered metallic silver will have less than 10 ppm of non-silver metals.

In addition to high purity, the metallic silver exhibits high crystallinity (e.g., as exhibited by powder X-ray diffraction (PXRD)).

The average particle size (which is considered to be the average longest cross-sectional dimension of the particles) of the metallic silver generally is less than or equal to about 1 micrometer. As used herein, the term "longest cross-sectional dimension" refers to the longest cross-sectional dimension of a particle. Thus, to clarify, when a particle is circular, the longest cross-sectional dimension is its diameter; when a particle is oval-shaped, the longest cross-sectional dimension is the longest diameter of the oval; and when a particle is irregularly-shaped, the longest cross-sectional dimension is the line between the two farthest opposing points on the perimeter of the particle. In many implementations, the average particle size of the metallic silver is about 50 nanometers (nm) to about 500 nm.

In one application of the methods described herein, the silver-containing aqueous solution is obtained from waste solutions that are generated when cleaning, rinsing, or otherwise processing glass that underwent a silver ion exchange process to impart the glass surface with antimicrobial properties. In such an application of the methods described herein, the silver-containing aqueous waste solution can include silver nitrate and optionally an alkali metal nitrate or phosphate.

The silver-containing aqueous waste solution can be treated with ascorbic acid and a buffering agent that is formed from a combination of sodium phosphate dibasic and citric acid. If this reaction solution has an initial pH of less than about 6, then the pH can be increased, using the optional base, to a range of about 6 to about 7.

Once the reaction solution with a pH of about 6 to about 7 is attained, it can be stirred slowly to dissolve and uniformly disperse the components thereof. This can take anywhere from 30 seconds to about 30 minutes (or more), depending on the size of the reaction solution.

The reaction solution can be allowed to sit at room temperature until a sufficient amount of metallic silver is produced. The a sample of the reaction solution can be checked periodically for silver content. Once the silver content is less than about 5 ppm (e.g., as measured by ICP-OES), then the reaction can be allowed to stop, and the metallic silver can be recovered. This can be accomplished by decanting or filtering.

In these applications of the methods described herein, the metallic silver product can be highly crystalline and can have less than 5 ppm of non-silver metals. In addition, the average particle size of this metallic silver product can be about 120 nm to about 400 nm.

The various embodiments of the present disclosure are further illustrated by the following non-limiting examples.

EXAMPLES

Example 1

In this example, about 100 milliliters (ml) of a silver ion exchange process's wastewater containing about 5000 ppm of dissolved silver, according to ICP-OES analysis, was placed into a glass beaker. Then, about 0.85 grams (g) ascorbic acid was added to the solution and mixed thoroughly. The pH of the mixture was about 1.7. Thereafter, about 2.33 g sodium phosphate dibasic ($Na_2HPO_4$) and about 0.33 g citric acid were added as buffering agents to the mixture and mixed well. The pH of the solution increased to about 6.7 after adding the buffering agents. The solution was allowed to stand for about 10 minutes after which the solution clarified indicating that precipitates had settled out. The solution was decanted to recover the precipitate. The pH of the decanted solution was unchanged at about 6.7. The decanted solution was analyzed by ICP-OES for residual silver concentration. The silver precipitate was washed in deionized water and dried for about 2 hours at 110° C. and then characterized using PXRD.

FIG. 1 is a PXRD pattern of the dried precipitate product produced in accordance with this example. The pattern shown in FIG. 1 is indicative of a highly-crystalline metallic silver sample. ICP-OES revealed that the solution sample contained less than 1 ppm of silver.

Example 2

In this example, about 100 ml of a silver ion exchange process's wastewater containing about 30,000 ppm of dissolved silver, according to ICP-OES analysis, was placed into a glass beaker. Then, about 4.9 g ascorbic acid was added to the solution and mixed thoroughly. Thereafter, about 2.33 g $Na_2HPO_4$ and about 0.33 g citric acid were added as buffering agents to the mixture and mixed well. The pH of this mixture was measured at about 0.4. To adjust the pH, about 4.0 g sodium hydroxide (50 wt %) was added to the solution. The pH after adjustment was about 6.6. The solution was allowed to stand for about 15 minutes after which the solution clarified indicating that precipitates had settled out. The solution was decanted to recover the precipitate. The pH of the decanted solution was unchanged at about 6.6. The decanted solution was analyzed by ICP-OES for residual silver concentration. The silver precipitate was washed in deionized water and dried for about 2 hours at 110° C. and then characterized using PXRD.

Figure 2:
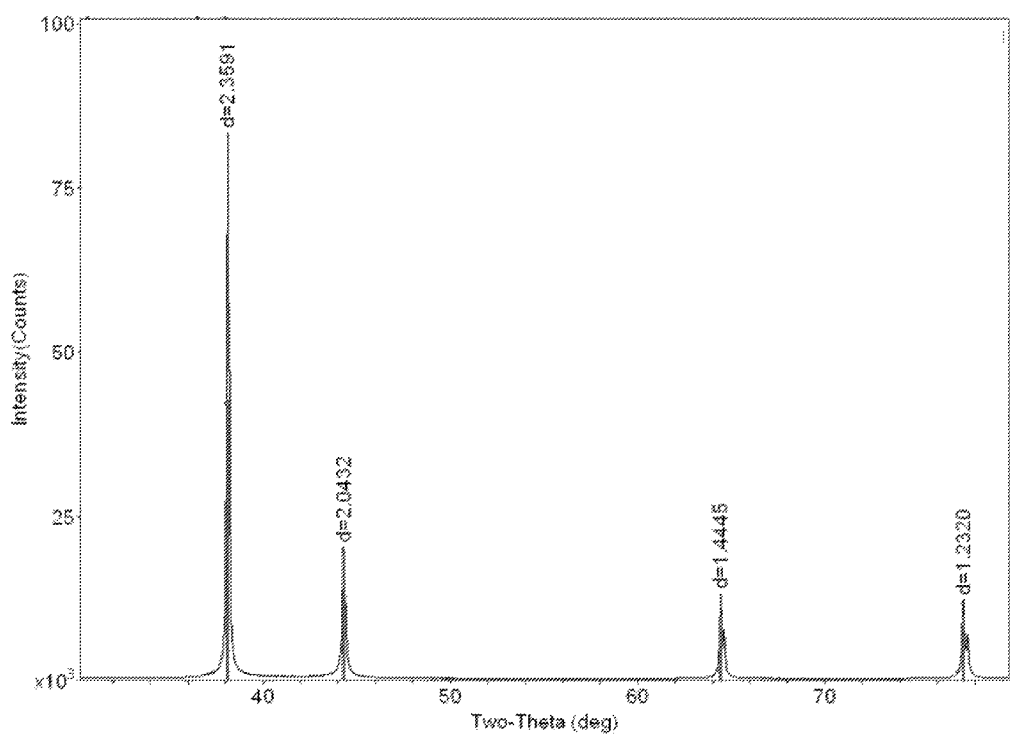
FIG. 2 is a powder X-ray diffraction pattern of the silver product recovered in accordance with EXAMPLE 2.

FIG. 2 is a PXRD pattern of the dried precipitate product produced in accordance with this example. The pattern shown in FIG. 2 is indicative of a highly-crystalline metallic silver sample. ICP-OES revealed that the solution sample contained less than 1 ppm of silver.

Example 3

In this example, about 100 ml of a silver ion exchange process's wastewater containing about 2000 ppm of dissolved silver, according to ICP-OES analysis, was placed into a glass beaker. Then, about 0.33 g ascorbic acid was added to the solution and mixed thoroughly. The pH of the mixture was about 1.7. Thereafter, about 2.33 g $Na_2HPO_4$ and about 0.33 g citric acid were added as buffering agents to the mixture and mixed well. The pH of this mixture was measured at about 6.7. The solution was allowed to stand for about 10 minutes after which the solution clarified indicating that precipitates had settled out. The solution was decanted to recover the precipitate. The pH of the decanted solution was unchanged at about 6.7. The decanted solution was analyzed by ICP-OES for residual silver concentration. The silver precipitate was washed in deionized water and dried for about 2 hours at 110° C. and then characterized using PXRD.

Figure 3:
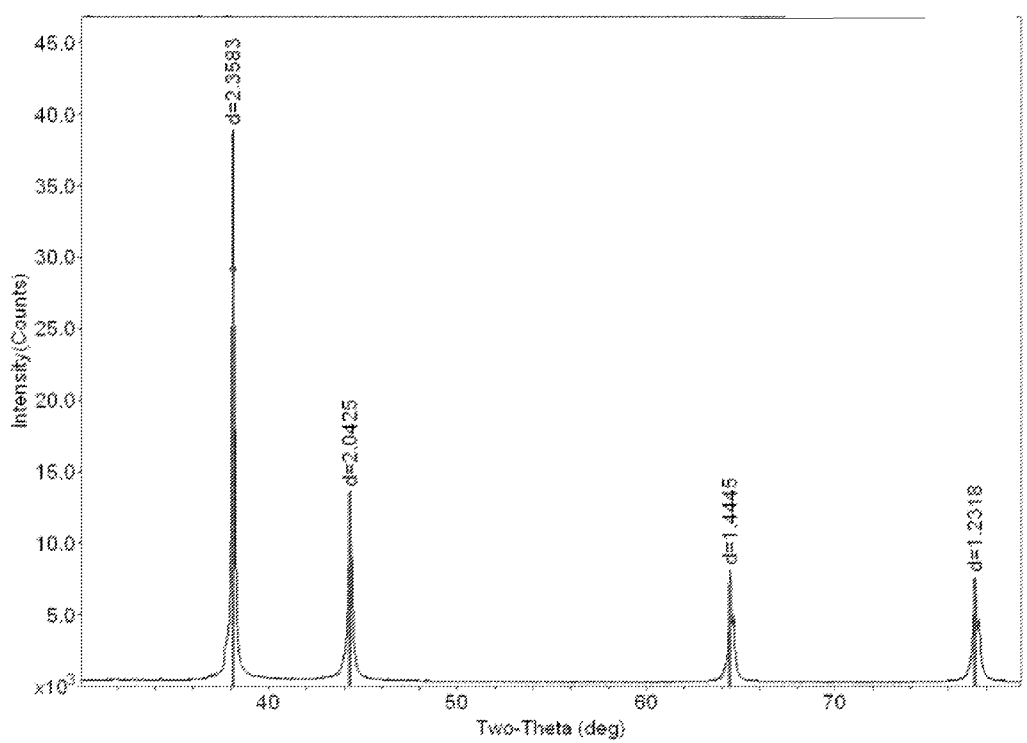
FIG. 3 is a powder X-ray diffraction pattern of the silver product recovered in accordance with EXAMPLE 3.

FIG. 3 is a PXRD pattern of the dried precipitate product produced in accordance with this example. The pattern shown in FIG. 3 is indicative of a highly-crystalline metallic silver sample. ICP-OES revealed that the solution sample contained less than 1 ppm of silver.

Each of the above examples verify that the methods disclosed herein provide treatment methods that are effective for recovering silver from silver-bearing solutions.

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

What is claimed is:

1. A method for treating a silver-containing solution, the method comprising:
   providing a silver-containing aqueous solution comprising cationic silver species;
   disposing an organic acid and a buffering agent in the silver-containing aqueous solution to form a reaction solution comprising a concentration of the organic acid, a concentration of the buffering agent, and a concentration of the cationic silver species, wherein the concentration of the organic acid is equimolar to or in a stoichiometric excess of the concentration of the cationic silver species, and wherein the buffering agent comprises citric acid and at least one of sodium phosphate dibasic and sodium phosphate monobasic; and
   generating a reaction product comprising metallic silver, thereby reducing the concentration of the cationic silver species in the reaction solution, wherein the metallic silver is precipitated from the solution.

2. The method of claim 1, wherein the silver-containing aqueous solution comprises silver nitrate, silver nitrite, silver sulfate, silver phosphate, a silver halide, or a mixture thereof.

3. The method of claim 1, wherein the organic acid comprises lactic acid, citric acid, oxalic acid, ascorbic acid, fumaric acid, maleic acid, or a mixture thereof.

4. The method of claim 1, wherein the generating comprises heating the reaction solution and/or mixing the reaction solution.

5. The method of claim 4, wherein the temperature of the heating is less than, or equal to about 90 degrees Celsius.

6. The method of claim 1, wherein a duration of the generating is about 5 minutes to about 24 hours.

7. The method of claim 1, further comprising adjusting an initial pH of the reaction solution before generating the reaction product.

8. The method of claim 1, further comprising recovering the metallic silver.

9. The method of claim 8, wherein the recovering comprises separating the metallic silver from a remaining portion of the reaction product and the reaction solution.

10. The method of claim 8, wherein the reduced concentration of the cationic silver species in the reaction solution is less than or equal to about 5 parts per million.

11. The method of claim 1, wherein the metallic silver is produced in a fractional yield of greater than 90 percent.

12. The method of claim 1, wherein the metallic silver has an average particle size of about 120 nm to about 400 nm.

13. The method of claim 1, wherein the metallic silver comprises less than 20 parts per million of non-silver metals.

14. A method for treating a silver-containing solution, the method comprising:
   providing a silver-containing aqueous solution comprising cationic silver species;
   disposing ascorbic acid and a buffering agent comprising sodium phosphate dibasic and citric acid in the silver-containing aqueous solution to form a reaction solution comprising a concentration of the ascorbic acid, a concentration of the buffering agent, and a concentration of the cationic silver species, wherein the concentration of the ascorbic acid is equimolar to or in a stoichiometric excess of the concentration of the cationic silver species;
   generating a reaction product comprising metallic silver, thereby reducing the concentration of the cationic silver species in the reaction solution to less than or equal to about 5 parts per million, wherein the metallic silver is precipitated from the solution; and
   separating the metallic silver from a remaining portion of the reaction product and the reaction solution by decanting.

15. The method of claim 14, further comprising adjusting an pH of the reaction solution before generating the reaction product to a pH about 6 to about 7.

16. The method of claim 14, wherein the metallic silver comprises less than 20 parts per million of non-silver metals and has an average particle size of about 120 nm to about 400 nm.

17. A method for treating a silver-containing solution, the method comprising:
   providing a silver-containing aqueous solution comprising cationic silver species;
   disposing an organic acid and a buffering agent formed from a combination of sodium phosphate dibasic and citric acid in the silver-containing aqueous solution to form a reaction solution comprising a concentration of the organic acid, a concentration of the buffering agent, and a concentration of the cationic silver species, wherein the concentration of the organic acid is equimolar to or in a stoichiometric excess of the concentration of the cationic silver species;
   generating a reaction product comprising metallic silver, thereby reducing the concentration of the cationic silver species in the reaction solution to less than or equal to about 5 parts per million, wherein the metallic silver has an average particle size of about 120 nm to about 400 nm and is precipitated from the solution; and
   separating the metallic silver from a remaining portion of the reaction product and the reaction solution by decanting,
   wherein the buffering agent is capable of maintaining a stable pH of about 6 to about 7 during the generating a reaction product step.

* * * * *